United States Patent
Balenda, II et al.

(10) Patent No.: US 9,958,047 B1
(45) Date of Patent: May 1, 2018

(54) DIFFERENTIAL ASSEMBLY AND MULTI-PIECE CROSS-PIN ASSEMBLY

(71) Applicant: American Axle & Manufacturing, Inc., Detroit, MI (US)

(72) Inventors: Joseph S. Balenda, II, Grand Blanc, MI (US); Ryan Ettenhofer, Detroit, MI (US); Thomas E. Gansenhuber, Lapeer, MI (US)

(73) Assignee: AMERICAN AXLE & MANUFACTURING, INC., Detroit, MI (US)

( * ) Notice: Subject to any disclaimer, the term of this patent is extended or adjusted under 35 U.S.C. 154(b) by 0 days. days.

(21) Appl. No.: 15/486,659

(22) Filed: Apr. 13, 2017

(51) Int. Cl.
F16H 48/08 (2006.01)

(52) U.S. Cl.
CPC ....... F16H 48/08 (2013.01); *F16H 2048/085* (2013.01); *F16H 2048/087* (2013.01)

(58) Field of Classification Search
CPC ........................................................ F16H 48/08
See application file for complete search history.

(56) References Cited

U.S. PATENT DOCUMENTS

| | | | | |
|---|---|---|---|---|
| 1,165,915 A * | 12/1915 | Sparks | ............... | F16H 48/08 475/204 |
| 1,544,805 A | 7/1925 | Celander | | |
| 3,593,595 A | 7/1971 | Taylor | | |
| 3,955,443 A * | 5/1976 | Estrada | ............... | F16H 48/08 475/230 |
| 6,146,304 A * | 11/2000 | Bendtsen | ............... | F16H 48/08 475/230 |
| 6,743,138 B2 | 6/2004 | Krzesicki et al. | | |
| 7,081,065 B2 | 7/2006 | Sudou | | |
| 2008/0261748 A1 * | 10/2008 | Sudorowski | ............ | F16H 48/08 475/230 |
| 2009/0075777 A1 * | 3/2009 | Han | ............... | F16H 48/08 475/230 |
| 2010/0184552 A1 * | 7/2010 | Soybel | ............... | F16H 48/08 475/230 |
| 2011/0269593 A1 * | 11/2011 | Knowles | ............... | B60K 17/35 475/84 |
| 2012/0149522 A1 * | 6/2012 | Isken, II | ............... | B21D 22/16 475/231 |
| 2014/0213407 A1 | 7/2014 | Fisher | | |

OTHER PUBLICATIONS

*Mechanical Movements—Powers & Devices, 11th Edition*, Gardner D. Hiscox M.E., 940. Multiple Gear Speed, p. 239, The Norman W. Henley Publishing Co. (1907).

* cited by examiner

*Primary Examiner* — Derek D Knight
(74) *Attorney, Agent, or Firm* — Harness, Dickey & Pierce, P.L.C.

(57) ABSTRACT

A differential includes a cross-pin assembly. The case can rotate about an output axis. First and second side gears can be rotatable about the output axis relative to the case. First, second, and third pinion gears can be meshingly engaged with the first and second side gears. The cross-pin assembly can include first, second, and third pin members, each having a cylindrical body and a finger fixedly coupled to a proximal end of the corresponding cylindrical body. The first, second, and third pinion gears can be rotatably disposed about the corresponding first, second, or third cylindrical body. The first, second, and third fingers can overlap along the output axis to non-rotatably couple the first, second, and third pin members together.

20 Claims, 7 Drawing Sheets

DIFFERENTIAL ASSEMBLY AND MULTI-PIECE CROSS-PIN ASSEMBLY

FIELD

The present disclosure relates to a differential assembly and a multi-piece cross-pin assembly.

BACKGROUND

This section provides background information related to the present disclosure which is not necessarily prior art.

One type of automotive differential employs a differential housing, a pair of bevel side gears and a plurality of bevel pinions. Some applications employ a single pair of bevel pinions that are meshingly engaged with the bevel side gears and supported for rotation in the differential housing about an axis via a single pinion shaft. Other applications employ three, equally spaced pinions that are supported for rotation in the differential housing about intersecting axes that form a "Y" shape (i.e., each axis forms a 60° angle between each other axis), and are meshingly engaged with the bevel side gears. Other applications employ more pinions, such as four equally spaced pinions that are supported for rotation in the differential housing about intersecting axes that form a plus ("+") shape, for example.

While such configurations work well for their intended purposes, the coupling of the pinion shafts relative to the differential housing can be complex and/or costly. Accordingly, there remains a need in the art for an improved differential having multiple pinion shafts that can be robustly secured relative to the differential housing in an efficient and cost-effective manner.

SUMMARY

This section provides a general summary of the disclosure, and is not a comprehensive disclosure of its full scope or all of its features.

In one form, the present teachings provide for a differential assembly which can include a case, a first side gear, a second side gear, a first pinion gear, a second pinion gear, a third pinion gear, and a cross-pin assembly. The case can be configured to be supported for rotation about an output axis. The first and second side gears can be rotatable about the output axis relative to the case. The first, second, and third pinion gears can be meshingly engaged with the first and second side gears. The cross-pin assembly can be coupled to the case for common rotation about the output axis with the case. The cross-pin assembly can include a first pin member, a second pin member, and a third pin member. The first pin member can include a first cylindrical body and a first finger fixedly coupled to a proximal end of the first cylindrical body. The first pinion gear can be rotatably disposed about the first cylindrical body. The second pin member can include a second cylindrical body and a second finger fixedly coupled to a proximal end of the second cylindrical body. The second pinion gear can be rotatably disposed about the second cylindrical body. The third pin member can include a third cylindrical body and a third finger fixedly coupled to a proximal end of the third cylindrical body. The third pinion gear can be rotatably disposed about the third cylindrical body. The first, second, and third fingers overlap along the output axis to non-rotatably couple the first, second, and third pin members together.

According to a further embodiment of the invention, the first finger can include a first side and a second side that extend from the proximal end of the first cylindrical body and converge to a tip of the first finger. The second finger can include a first side and a second side that extend from the proximal end of the second cylindrical body and converge to a tip of the second finger. The third finger can include a first side and a second side that extend from the proximal end of the third cylindrical body and converge to a tip of the third finger. The proximal end of the first cylindrical body can oppose the first side of the second finger and the first side of the third finger. The proximal side of the second cylindrical body can oppose the second side of the first finger and the second side of the third finger. The proximal side of the third cylindrical body can oppose the first side of the first finger and the second side of the second finger.

According to a further embodiment of the invention, the first and second sides of the first finger can define a first interior angle of approximately 60°. The first and second sides of the second finger can define a second interior angle of approximately 60°. The first and second sides of the third finger can define a third interior angle of approximately 60°.

According to a further embodiment of the invention, the first finger can include a first surface. The second finger can include a second surface and a third surface. The third finger can include a fourth surface. The second and third surfaces can face opposite directions. The first surface can oppose the second surface. The third surface can oppose the fourth surface.

According to a further embodiment of the invention, the first, second, third, and fourth surfaces are perpendicular to the output axis.

According to a further embodiment of the invention, the differential assembly can further include a retainer member. The first finger can include a first bore. The second finger can include a second bore. The third finger can include a third bore. The retainer member can be disposed within the first, second, and third bores to couple the first, second, and third pin members together.

According to a further embodiment of the invention, the retainer member can be formed of a resilient material having an uncompressed outermost diameter greater than the first, second, and third bores.

According to a further embodiment of the invention, each of the first, second, and third pin members can include an outermost cylindrical surface and a lubrication channel recessed from the outermost cylindrical surface.

According to a further embodiment of the invention, the differential assembly can further comprise a fourth pinion gear meshingly engaged with the first and second side gears. The second pin member can include a fourth cylindrical body. A proximal end of the fourth cylindrical body can be fixedly coupled to a side of the second finger that is opposite the second cylindrical body. The fourth pinion gear can be rotatably disposed about the fourth cylindrical body.

According to a further embodiment of the invention, the second pin member can include a pair of side walls that extend outward from the second surface to inhibit movement of the first finger relative to the second pin member.

In another form, the present teachings further provide for a cross-pin assembly for a differential that can include a case, a first side gear, a second side gear, a first pinion gear, a second pinion gear, and a third pinion gear. The case can be configured to be supported for rotation about an output axis. The first and second side gears can be rotatable about the output axis relative to the case. The first, second, and third pinion gears can be meshingly engaged with the first and second side gears. The cross-pin assembly can include a first pin member, a second pin member, and a third pin member. The first pin member can include a first cylindrical body and a first finger fixedly coupled to a proximal end of the first cylindrical body. The first cylindrical body can be adapted to support the first pinion gear for rotation relative to the case. The first finger can include a first side and a second side that extend from the proximal end of the first cylindrical body. The first and second sides of the first finger can converge toward a tip of the first finger. The second pin member can include a second cylindrical body and a second finger fixedly coupled to a proximal end of the second cylindrical body. The second cylindrical body can be adapted to support the second pinion gear for rotation relative to the case. The second finger can include a first side and a second side that extend from the proximal end of the second cylindrical body. The first and second sides of the second finger can converge toward a tip of the second finger. The third pin member can include a third cylindrical body and a third finger fixedly coupled to a proximal end of the third cylindrical body. The third cylindrical body can be adapted to support the third pinion gear for rotation relative to the case. The third finger can include a first side and a second side that extend from the proximal end of the third cylindrical body. The first and second sides of the third finger can converge toward a tip of the third finger. The proximal end of the first cylindrical body can oppose the first side of the second finger and the first side of the third finger. The proximal side of the second cylindrical body can oppose the second side of the first finger and the second side of the third finger. The proximal side of the third cylindrical body can oppose the first side of the first finger and the second side of the second finger.

According to a further embodiment of the invention, the first finger can include a first surface. The second finger can include a second surface and a third surface. The third finger can include a fourth surface. The second and third surfaces can face opposite directions. The first surface can oppose the second surface. The third surface can oppose the fourth surface.

According to a further embodiment of the invention, the first, second, third, and fourth surfaces are perpendicular to the output axis.

According to a further embodiment of the invention, the differential assembly can further include a retainer member. The first finger can include a first bore. The second finger can include a second bore. The third finger can include a third bore. The retainer member can be disposed within the first, second, and third bores to couple the first, second, and third pin members together.

According to a further embodiment of the invention, the retainer member can be formed of a resilient material having an uncompressed outermost diameter greater than the first, second, and third bores.

According to a further embodiment of the invention, each of the first, second, and third pin members can include an outermost cylindrical surface and a lubrication channel recessed from the outermost cylindrical surface.

According to a further embodiment of the invention, a longitudinal axis of the first cylindrical body can form a 60 degree angle with a longitudinal axis of the second cylindrical body and a longitudinal axis of the third cylindrical body.

In another form, the present teachings further provide for a cross-pin assembly for a differential that can include a case, a first side gear, a second side gear, a first pinion gear, a second pinion gear, a third pinion gear, and a fourth pinion gear. The case can be adapted to be supported for rotation about an output axis. The first and second side gears can be rotatable about the output axis relative to the case. The first, second, third, and fourth pinion gears can be meshingly engaged with the first and second side gears. The cross-pin assembly can include a first pin member, a second pin member, and a third pin member. The first pin member can include a first cylindrical body and a first attachment portion fixedly coupled to a proximal end of the first cylindrical body. The first cylindrical body can be adapted to rotatably support the first pinion gear. The second pin member can include a second cylindrical body, a third cylindrical body, a second attachment portion, and a third attachment portion. The second and third attachment portions can fixedly couple a proximal end of the second cylindrical body to a proximal end of the third cylindrical body. The second cylindrical body can be adapted to rotatably support the second pinion gear. The third cylindrical body can be adapted to rotatably support the third pinion gear. The third pin member can include a fourth cylindrical body and a fourth attachment portion fixedly coupled to a proximal end of the fourth cylindrical body. The fourth cylindrical body can be adapted to rotatably support the fourth pinion gear. The first, second, third, and fourth attachment portions can overlap along the output axis.

According to a further embodiment of the invention, the first attachment portion can include a first finger, the second attachment portion can include a first aperture. The first finger can be slidably received within the first aperture.

According to a further embodiment of the invention, the first attachment portion can include a first surface. The second attachment portion can include a second surface. The third attachment portion can include a third surface. The fourth attachment portion can include a fourth surface. The second and third surfaces can face opposite directions. The first surface can oppose the second surface. The third surface can oppose the fourth surface.

According to a further embodiment of the invention, the cross-pin assembly can further include a retainer member. The first attachment portion can include a first bore. The second and third attachment portions can include a second bore. The fourth attachment portion can include a third bore. The retainer member can be disposed within the first, second, and third bores to couple the first, second, and third pin members together.

According to a further embodiment of the invention, the retainer member can be formed of a resilient material having an uncompressed outermost diameter greater than the first, second, and third bores.

Further areas of applicability will become apparent from the description and claims herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
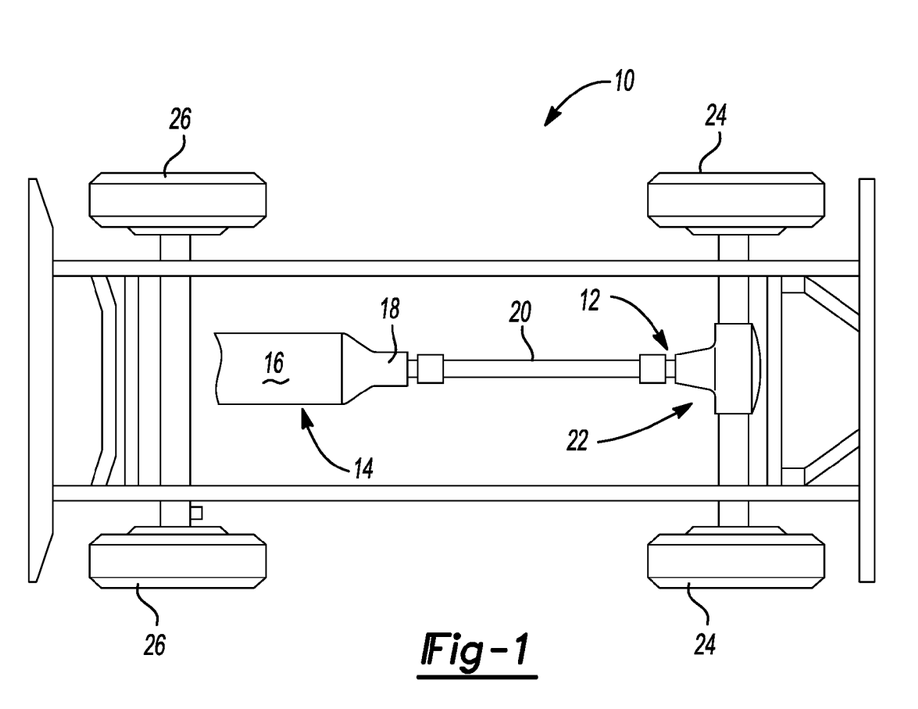
FIG. 1 is a schematic illustration of a motor vehicle equipped with an axle assembly constructed in accordance with the present teachings.

With reference to FIG. 1 of the drawings, a vehicle having an axle assembly that is constructed in accordance with the teachings of the present disclosure is generally indicated by reference numeral 10. The vehicle 10 can include a driveline 12 that can be drivable via a connection to a power train 14. The power train 14 can include an engine 16 and a transmission 18. The driveline 12 can include a propshaft 20, an axle assembly 22, and a plurality of wheels 24 and 26. In the example provided, the axle assembly 22 is a rear axle assembly configured to drive a set of rear wheels 24, though other configurations can be used. The engine 16 can be mounted in an in-line or longitudinal orientation along the axis of the vehicle 10, though other configurations can be used. The output of the engine 16 can be selectively coupled via a conventional clutch to the input of the transmission 18 to transmit rotary power (i.e., drive torque) therebetween. In the example provided, the input of the transmission 18 can be commonly aligned with the output of the engine 16 for rotation about a rotary axis. The transmission 18 can also include an output and a gear box having a plurality of drive ratios, such as in a manual transmission, or an automatic transmission. Alternatively, the transmission 18 can be a continuously variable transmission. The gear box can be operable for coupling the transmission input to the transmission output at a predetermined gear speed ratio. The propshaft 20 can be coupled for rotation with the output of the transmission 18. Drive torque can be transmitted through the prophaft 20 to the rear axle assembly 22 where it can be apportioned to the left and the right wheels 24.

Figure 2:
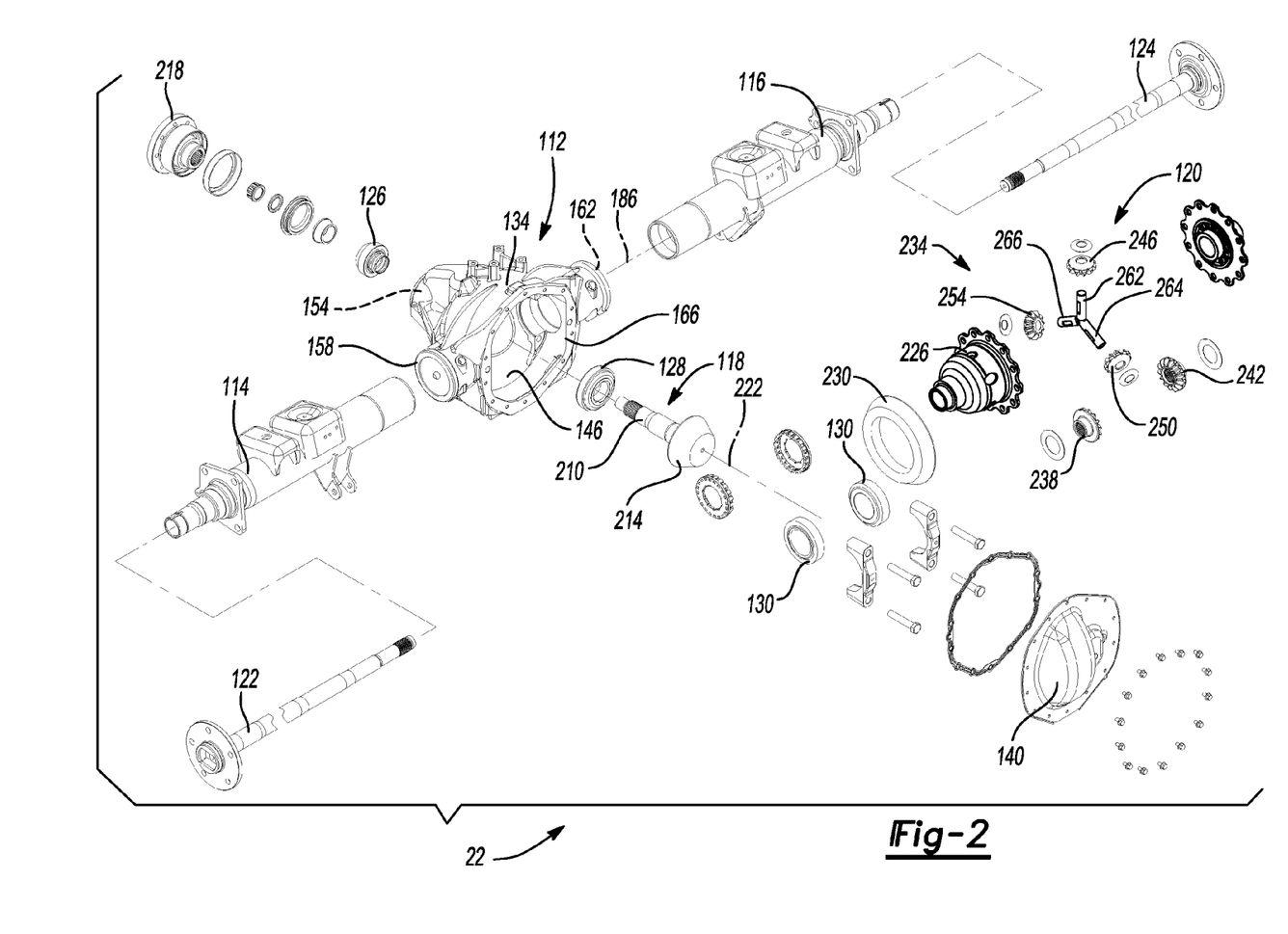
FIG. 2 is an exploded perspective view of the axle assembly of FIG. 1, illustrating a differential of the axle assembly.

With additional reference to FIG. 2, the example axle assembly 22 is illustrated in greater detail. The axle assembly 22 can include a housing assembly 112, a first axle tube 114, a second axle tube 116, an input pinion 118, a differential assembly 120, a first output member 122, a second output member 124, a tail bearing 126, a head bearing 128, and a pair of differential bearings 130. While the differential assembly 120 is described herein with reference to a rear axle assembly, the differential assembly 120 of the present teachings can be used in other configurations, such as in a transaxle (not shown) or other front-wheel drive or all-wheel drive drivelines (not shown) for example.

In the example provided, the housing assembly 112 can include a main body 134 and a cover body 140. The main body 134 can define an inner cavity 146. In the example provided, a front side of the main body 134 can include an input aperture 154, a left side of the main body 134 can include a first output aperture 158, a right side of the main body 134 can include a second output aperture 162, and a rear side of the main body 134 can include a main aperture or differential aperture 166. The input aperture 154, the first output aperture 158, the second output aperture 162, and the differential aperture 166 can be open through the main body 134 between the inner cavity 146 and an exterior of the main body 134.

The cover 140 can span across the differential aperture 166 to cover the differential aperture 166. The cover body 140 can be mounted to the main body 134, such as by fasteners for example, to encase the differential assembly 120 within the inner cavity 146.

The first axle tube 114 can be fixedly attached to the main body 134 at the first output aperture 158 and can be coaxial with the first output aperture 158. The first output member 122 can be disposed within the first axle tube 114 and supported therein for rotation about an output axis 186. An inboard end of the first output member 122 can extend into the inner cavity 146. An outboard end of the first output member 122 can extend outward of an outboard end of the first axle tube 114 and can be drivingly coupled to a corresponding one of the wheels 24 (FIG. 1).

The second axle tube 116 can be fixedly attached to the main body 134 at the second output aperture 162 and can be coaxial with the second output aperture 162. The second output member 124 can be disposed within the second axle tube 116 and supported therein for rotation about the output axis 186. An inboard end of the second output member 124 can extend into the inner cavity 146. An outboard end of the second output member 124 can extend outward of an outboard end of the second axle tube 116 and can be drivingly coupled to a corresponding one of the wheels 24 (FIG. 1).

The input pinion 118 can include a pinion shaft 210, a pinion gear 214, and an input flange 218. The pinion shaft 210 can extend through the input aperture 154. The input flange 218 can be fixedly mounted to one end of the pinion shaft 210 and disposed external of the main body 134. The input flange 218 can be coupled to the propshaft 20 (FIG. 1) for common rotation therewith. The pinion gear 214 can be fixedly coupled to the other end of the pinion shaft 210 and disposed within the inner cavity 146. The pinion shaft 210 can be supported for rotation about an input axis 222 by the tail bearing 126 proximate to the input flange 218, and the head bearing 128 proximate to the pinion gear 214. The input axis 222 can be transverse to the output axis 186. In the example provided, the pinion gear 214 is a hypoid gear and the input axis 222 is perpendicular to and offset from the output axis 186, though other configurations can be used.

The differential assembly 120 can be any suitable type of differential configured to receive input torque from the input pinion 118 and output differential output torque to the first and second output members 122, 124. In the example provided, the differential assembly 120 includes an open differential that includes a differential case 226, a ring gear 230, a cross-pin assembly 234, a first side gear 238, a second side gear 242, a first differential pinion 246, a second differential pinion 250, and a third differential pinion 254. The differential case 226 can be supported within the inner cavity 146 of the main body 134 for rotation relative to the main body 134, such as by the differential bearings 130. The ring gear 230 can be fixedly coupled to the differential case 226 for common rotation about the output axis 186, such as by welding or fasteners (not specifically shown) for example.

The cross-pin assembly 234 can be mounted to the differential case 226 for common rotation about the output axis 186 with the differential case 226. The cross-pin assembly 234 is described in greater detail below, but can generally have a first pin member 262, a second pin member 264, and a third pin member 266. The first pin member 262 can extend through the interior of the differential case 226 such that the longitudinal axis of the first pin member 262 is perpendicular to the output axis 186. The second pin member 264 can extend through the interior of the differential case 226, such that the longitudinal axis of the second pin member 264 is perpendicular to the output axis 186 and forms a 60° angle with the longitudinal axis of the first pin member 262. The third pin member 266 can extend through the interior of the differential case 226, such that the longitudinal axis of the third pin member 266 is perpendicular to the output axis 186 and forms a 60° angle with the longitudinal axes of the first and second pin members 262, 264. In other words, the first, second, and third pin members 262, 264, 266 are equally angularly spaced about the output axis 186 to form an equi-angled Y-shape, (e.g., a three-pronged star shape).

The differential pinions 246, 250, 254 can be located within the differential case 226. The first differential pinion 246 can be disposed about the first pin member 262, such that the first differential pinion 246 is rotatably mounted to the first pin member 262 within the differential case 226 for common rotation about the output axis 186 with the differential case 226, while being rotatable relative to the differential case 226 and the first pin member 262 about the longitudinal axis of the first pin member 262.

The second differential pinion 250 can be disposed about the second pin member 264, such that the second differential pinion 250 is rotatably mounted to the second pin member 264 within the differential case 226 for common rotation about the output axis 186 with the differential case 226, while being rotatable relative to the differential case 226 and the second pin member 264 about the longitudinal axis of the second pin member 264.

The third differential pinion 254 can be disposed about the third pin member 266, such that the third differential pinion 254 is rotatably mounted to the third pin member 266 within the differential case 226 for common rotation about the output axis 186 with the differential case 226, while being rotatable relative to the differential case 226 and the third pin member 266 about the longitudinal axis of the third pin member 266.

The first and second side gears 238, 242 can be disposed about the output axis 186 and mounted within the differential case 226, on opposite axial sides of the differential case 226, for rotation relative to the differential case 226 about the output axis 186. The first side gear 238 can be meshingly engaged with the differential pinions 246, 250, 254. The second side gear 242 can be meshingly engaged with the differential pinions 246, 250, 254. The inboard end of the first output member 122 can be non-rotatably coupled to the first side gear 238 for common rotation about the output axis 186, such as via mating splines for example. The inboard end of the second output member 124 can be non-rotatably coupled to the second side gear 242 for common rotation about the output axis 186, such as via mating splines for example.

Figures 3, 4:
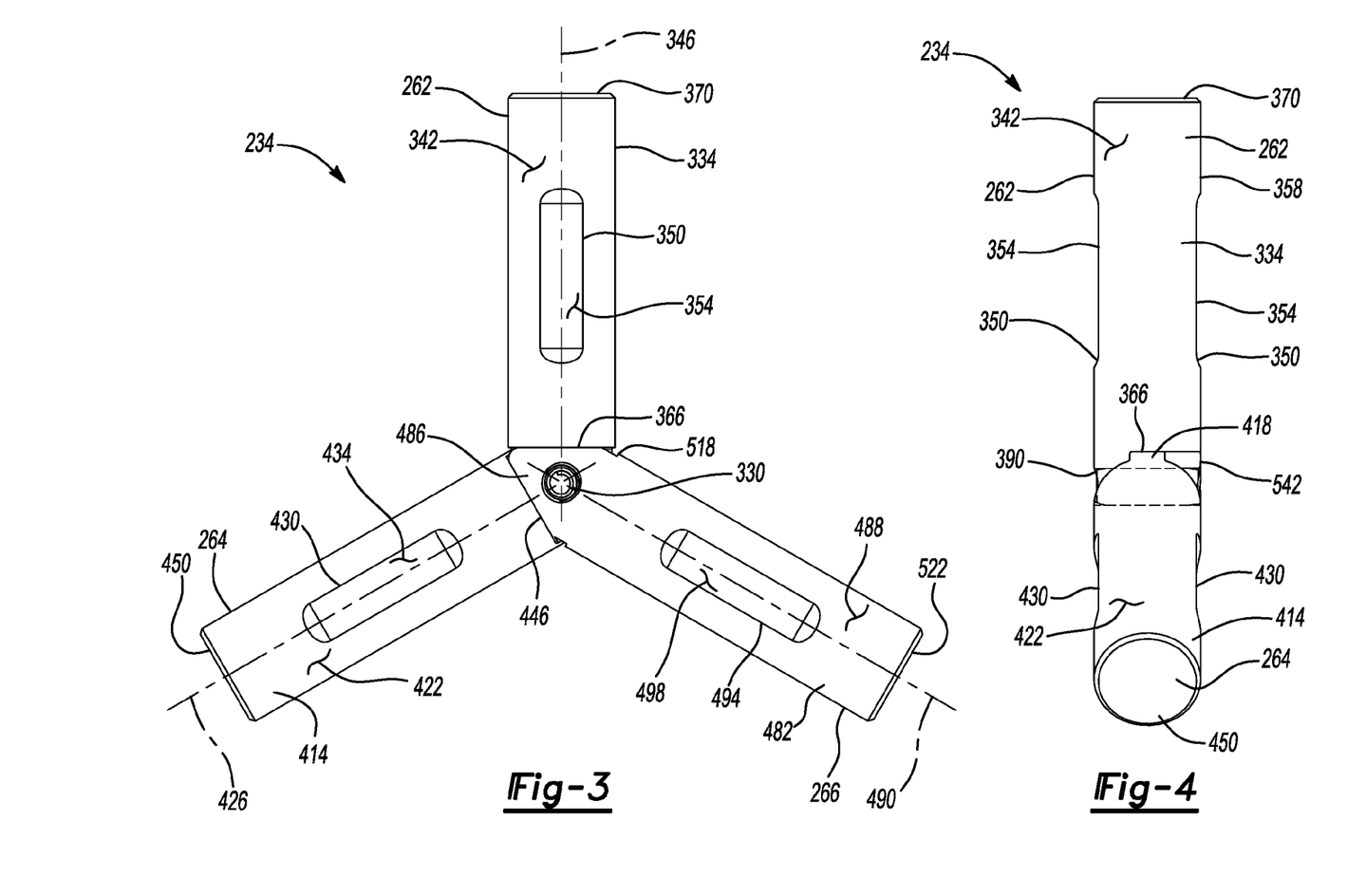
FIG. 3 is a front view of a cross-pin assembly of a first construction of the differential of FIG. 2.
FIG. 4 is a side view of the cross-pin assembly of FIG. 3.
Figure 5:
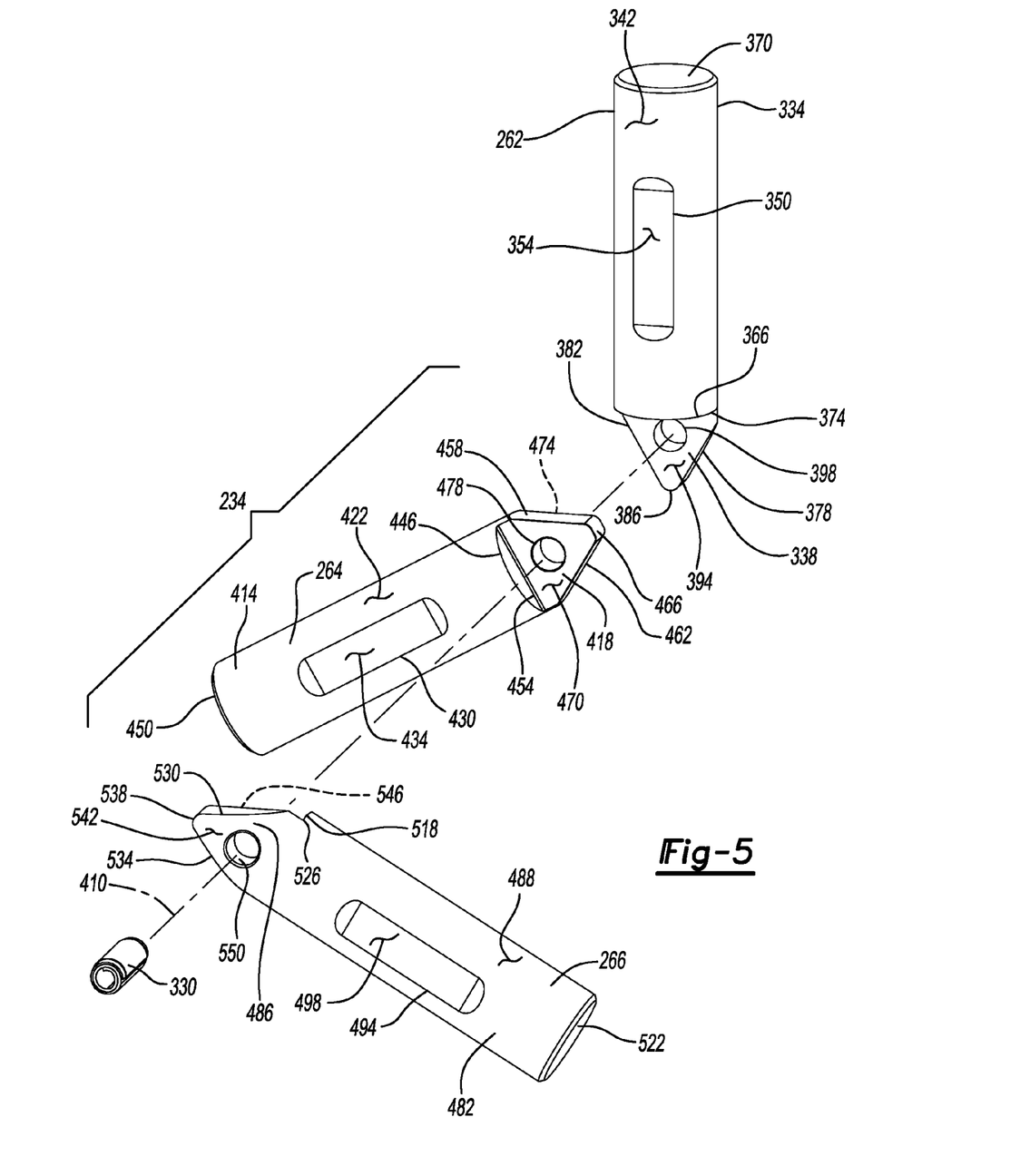
FIG. 5 is an exploded perspective view of the cross-pin assembly of FIG. 3.

With additional reference to FIGS. 3-5, the cross-pin assembly 234 can include the first pin member 262, the second pin member 264, the third pin member 266, and a retainer member 330. The first pin member 262 can include a first cylindrical body 334 and a first finger 338 that defines a first attachment portion. The first cylindrical body 334 can have an outermost cylindrical surface 342 coaxial with the longitudinal axis of the first pin member 262 (i.e., first pinion axis 346). The first pinion gear 246 can be rotatably supported about the first cylindrical body 334. In the example provided, the first cylindrical body 334 includes a pair of lubrication channels 350 that can be recessed radially inward from the outermost cylindrical surface 342. In the example provided, the lubrication channels 350 can each have a flat surface 354 recessed radially inward from the outermost cylindrical surface 342. The flat surfaces 354 can be recessed such that a perpendicular distance from the first pinion axis 346 to each flat surface 354 is less than a radial distance from the first pinion axis 346 to the outermost cylindrical surface 342.

The lubrication channels 350 can be on diametrically opposite sides of the first cylindrical body 334 (e.g., front and rear sides 358, 362), such that the flat surfaces 354 can be parallel to one another. The flat surfaces 354 can extend longitudinally in the direction parallel to the first pinion axis 346. A total longitudinal length of the first cylindrical body 334 can be greater than a total longitudinal length of each lubrication channel 350 and opposite longitudinal ends of each lubrication channel 350 can be axially spaced apart from opposite longitudinal ends of the first cylindrical body 334 (i.e., a proximal end 366 and a distal end 370 of the first cylindrical body 334).

The first finger 338 can be fixedly coupled to the proximal end 366 of the first cylindrical body 334 and can extend axially therefrom, with regards to the first pinion axis 346. In the example provided, the first finger 338 is unitarily formed with the first cylindrical body 334. The first finger 338 can extend axially from the rear side 362 of the proximal end 366.

The first finger 338 can narrow with distance away from the proximal end 366 of the first cylindrical body 334. In other words, the first finger 338 can have a generally triangular shape having a base 374 along the proximal end 366 of the first cylindrical body 334, generally perpendicular to the first pinion axis 346, and first and second sides 378, 382 extending from the base 374 to a tip 386. The triangular shape of the first finger 338 can be an equilateral triangle, such that the first and second sides 378, 382 form an interior angle of 60°. When viewed from the front or rear sides 358, 362, such as shown in FIG. 3, the tip 386 can be aligned with the first pinion axis 346, such that the first and second sides 378, 382 can each form an interior angle of 30° with the first pinion axis 346.

The first finger 338 can have an outer facing surface 390 that faces away from the first pinion axis 346. The first attachment portion of the first finger 338 can have an inner facing surface 394 that faces toward the first pinion axis 346, and a bore 398 that extends through the outer and inner facing surfaces 390, 394. In the example provided, the outer facing surface 390 of the first finger 338 is cylindrical and flush with the outermost cylindrical surface 342 of the first cylindrical body 334, though other configurations can be used. The inner facing surface 394 of the first finger 338 can be generally parallel to the first pinion axis 346 and offset from the first pinion axis 346. In the example provided, the inner facing surface 394 of the first finger 338 can be parallel to the flat surfaces 354 of the lubrication channel 350. In the example provided, a maximum perpendicular distance from the inner facing surface 394 to the outer facing surface 390 of the first finger 338 can be approximately one-third of the diameter of the first cylindrical body 334, though other configurations can be used.

The bore 398 can extend along a bore axis 410 through the first finger 338. The bore axis 410 can be perpendicular to the first pinion axis 346 and the inner facing surface 394. The bore axis 410 can extend through the center of the equilateral triangle shape of the first finger 338, such that the bore 398 can be centered within the first finger 338. The bore 398 can be open at the inner facing surface 394 and the outer facing surface 390. In the example provided, the bore axis 410 can be coaxial with the output axis 186 (FIG. 2). Thus, the output axis 186 can extend through the first, second, and third fingers 338, 418, 486, such that the first, second, and third fingers 338, 418, 486 can overlap along the output axis 186.

The second pin member 264 can include a second cylindrical body 414 and a second finger 418 that defines second and third attachment portions. The second cylindrical body 414 can have an outermost cylindrical surface 422 coaxial with the longitudinal axis of the second pin member 264 (i.e., second pinion axis 426). The second pinion gear 250 can be rotatably supported about the second cylindrical body 414. In the example provided, the second cylindrical body 414 includes a pair of lubrication channels 430 that can be recessed radially inward from the outermost cylindrical surface 422. In the example provided, the lubrication channels 430 can each have a flat surface 434 recessed radially inward from the outermost cylindrical surface 422. The flat surfaces 434 can be recessed such that a perpendicular distance from the second pinion axis 426 to each flat surface 434 is less than a radial distance from the second pinion axis 426 to the outermost cylindrical surface 422.

The lubrication channels 430 can be on diametrically opposite sides of the second cylindrical body 414 (e.g., front and rear sides 358, 362), such that the flat surfaces 434 can be parallel to one another. The flat surfaces 434 can extend longitudinally in the direction parallel to the second pinion axis 426. A total longitudinal length of the second cylindrical body 414 can be greater than a total longitudinal length of each lubrication channel 430 and opposite longitudinal ends of each lubrication channel 430 can be axially spaced apart from opposite longitudinal ends of the second cylindrical body 414 (i.e., a proximal end 446 and a distal end 450 of the second cylindrical body 414).

The second finger 418 can be fixedly coupled to the proximal end 446 of the second cylindrical body 414 and can extend axially therefrom, with regards to the second pinion axis 426. In the example provided, the second finger 418 is unitarily formed with the second cylindrical body 414. The second finger 418 can extend axially from a middle portion (i.e., between and spaced apart from the front and rear sides 358, 362) of the proximal end 446.

The second finger 418 can narrow with distance away from the proximal end 446 of the second cylindrical body 414. In other words, the second finger 418 can have a generally triangular shape having a base 454 along the proximal end 446 of the second cylindrical body 414, generally perpendicular to the second pinion axis 426, and first and second sides 458, 462 extending from the base 454 to a tip 466. The triangular shape of the second finger 418 can be an equilateral triangle, such that the first and second sides 458, 462 form an interior angle of 60°. When viewed from the front or rear sides 358, 362, such as shown in FIG. 3, the tip 466 can be aligned with the second pinion axis 426, such that the first and second sides 458, 462 can each form an interior angle of 30° with the second pinion axis 426.

The second attachment portion of the second finger 418 can an outer facing surface 470 and the third attachment portion can have an outer facing surface 474. The outer facing surfaces 470, 474 can face away from the second pinion axis 426 in opposite directions, and a bore 478 can extend through the outer facing surfaces 470, 474. In the example provided, the outer facing surfaces 470, 474 of the second finger 418 can be parallel to each other and parallel to the second pinion axis 426 and offset from the second pinion axis 426. In the example provided, the outer facing surfaces 470, 474 can be equi-distant from the second pinion axis 426, though other configurations can be used. In the example provided, the outer facing surfaces 470, 474 of the second finger 418 can be parallel to the flat surfaces 434 of the lubrication channel 430. In the example provided, a maximum perpendicular distance between the outer facing surfaces 470, 474 of the second finger 418 can be approximately one-third of the diameter of the second cylindrical body 414, though other configurations can be used.

The bore 478 can extend along the bore axis 410 through the second finger 418. The bore axis 410 can be perpendicular to the second pinion axis 426 and the outer facing surfaces 470, 474 of the second finger 418. The bore axis 410 can extend through the center of the equilateral triangle shape of the second finger 418, such that the bore 478 can be centered within the second finger 418. The bore 478 can be open at the outer facing surfaces 470, 474.

The third pin member 266 can be generally similar to the first pin member 262 and can include a third cylindrical body 482 and a third finger 486 that defines a fourth attachment portion. The third cylindrical body 482 can have an outermost cylindrical surface 488 coaxial with the longitudinal axis of the third pin member 266 (i.e., third pinion axis 490). The third pinion gear 254 can be rotatably supported about the third cylindrical body 482. In the example provided, the third cylindrical body 482 includes a pair of lubrication channels 494 that can be recessed radially inward from the outermost cylindrical surface 488. In the example provided, the lubrication channels 494 can each have a flat surface 498 recessed radially inward from the outermost cylindrical surface 488. The flat surfaces 498 can be recessed such that a perpendicular distance from the third pinion axis 490 to each flat surface 498 is less than a radial distance from the third pinion axis 490 to the outermost cylindrical surface 488.

The lubrication channels 494 can be on diametrically opposite sides of the third cylindrical body 482 (e.g., front and rear sides 358, 362), such that the flat surfaces 498 can be parallel to one another. The flat surfaces 498 can extend longitudinally in the direction parallel to the third pinion axis 490. A total longitudinal length of the third cylindrical body 482 can be greater than a total longitudinal length of each lubrication channel 494 and opposite longitudinal ends of each lubrication channel 494 can be axially spaced apart from opposite longitudinal ends of the third cylindrical body 482 (i.e., a proximal end 518 and a distal end 522 of the third cylindrical body 482).

The third finger 486 can be fixedly coupled to the proximal end 518 of the third cylindrical body 482 and can extend axially therefrom, with regards to the third pinion axis 490. In the example provided, the third finger 486 is unitarily formed with the third cylindrical body 482. The third finger 486 can extend axially from the front side 358 of the proximal end 518.

The third finger 486 can narrow with distance away from the proximal end 518 of the third cylindrical body 482. In other words, the third finger 486 can have a generally triangular shape having a base 526 along the proximal end 518 of the third cylindrical body 482, generally perpendicular to the third pinion axis 490, and first and second sides 530, 534 extending from the base 526 to a tip 538. The triangular shape of the third finger 486 can be an equilateral triangle, such that the first and second sides 530, 534 form an interior angle of 60°. When viewed from the front or rear sides 358, 362, such as shown in FIG. 3, the tip 538 can be aligned with the third pinion axis 490, such that the first and second sides 530, 534 can each form an interior angle of 30° with the third pinion axis 490.

The third finger 486 can have an outer facing surface 542 that faces away from the third pinion axis 490. The fourth attachment portion of the third finger 486 can have an inner facing surface 546 that faces toward the third pinion axis 490, and a bore 550 that extends through the outer and inner facing surfaces 542, 546. In the example provided, the outer facing surface 542 of the third finger 486 is cylindrical and flush with the outermost cylindrical surface 488 of the third cylindrical body 482, though other configurations can be used. The inner facing surface 546 of the third finger 486 can be generally parallel to the third pinion axis 490 and offset from the third pinion axis 490. In the example provided, the inner facing surface 546 of the third finger 486 can be parallel to the flat surfaces 498 of the lubrication channel 494. In the example provided, a maximum perpendicular distance from the inner facing surface 546 to the outer facing surface 542 of the third finger 486 can be approximately one-third of the diameter of the third cylindrical body 482, though other configurations can be used.

The bore 550 can extend along the bore axis 410 through the third finger 486. The bore axis 410 can be perpendicular to the third pinion axis 490 and the inner facing surface 546. The bore axis 410 can extend through the center of the equilateral triangle shape of the third finger 486, such that the bore 550 can be centered within the third finger 486. The bore 550 can be open at the inner facing surface 546 and the outer facing surface 542. Thus, the bores 398, 478, 550 can be coaxial. In the example provided, the bores 398, 478, 550 can have the same diameters, though other configurations can be used.

The first, second, and third pin members 262, 264, 266 can be assembled such that the attachment portions of the fingers 338, 418, 486 can be nested with each other. The base 374 (e.g., the proximal end 366 of the first pin member 262) can oppose and contact the first side 458 of the second finger 418 and the first side 530 of the third finger 486. The inner facing side 394 of the first finger 338 can oppose and contact the outer facing side 474 of the second finger 418. The base 454 (e.g., the proximal end 446 of the second cylindrical body 414) can oppose and contact the second side 382 of the first finger 338 and the second side 534 of the third finger 486. The outer facing side 470 of the second finger 418 can oppose and contact the inner facing side 546 of the third finger 486. In the example provided, the lengths of the bases 374, 454, 526, first sides 378, 458, 530, and second sides 382, 462, 534 can be equal. Thus, the inner facing surfaces 394, 546 of the first and third fingers 338, 486 can cooperate to define a slot in which the second finger 418 can be disposed between the first and third fingers 338, 486.

The bores can align along the bore axis 410 and the retaining member 330 can be inserted into the bores 398, 478, 550 to retain the first, second, and third pin members 262, 264, 266 relative to each other. The cross-pin assembly 234 can be assembled within the differential case 226.

In the example provided, the retainer member 330 can be a generally cylindrical body that can be resilient in a radial direction with regard to the bore axis 410. In other words, the retainer member 330 can have a natural (i.e., uncompressed) diameter that can be greater than the bores 398, 478, 550, and can be resiliently compressed to a diameter equal or lesser than the bores 398, 478, 550. Thus, the retainer member 330 can be compressed to be inserted into the bores 398, 478, 550 and then resiliently expand to apply radially outward pressure on the interior surfaces of the bores 398, 478, 550 to retain the retainer member 330 within the bores 398, 478, 550. By way of one non-limiting example, the retainer member 330 can be a roll-pin, also called a spring pin or a tension pin. In the example provided, the retainer member 330 is a coil spring pin, though other configurations can be used, such as slotted spring pins for example.

In an alternative construction, the retainer member 330 can be a non-resilient member, such as a cotter pin for example, that can be inserted into the bores 398, 478, 550 and then deformed to be retained in the bores 398, 478, 550. In another alternative construction, the retainer member 330 can be a non-resilient member, such as a rigid cylindrical pin that can be press-fit, or threaded into the bores 398, 478, 550 for example, to be retained in the bores 398, 478, 550.

Figure 6:
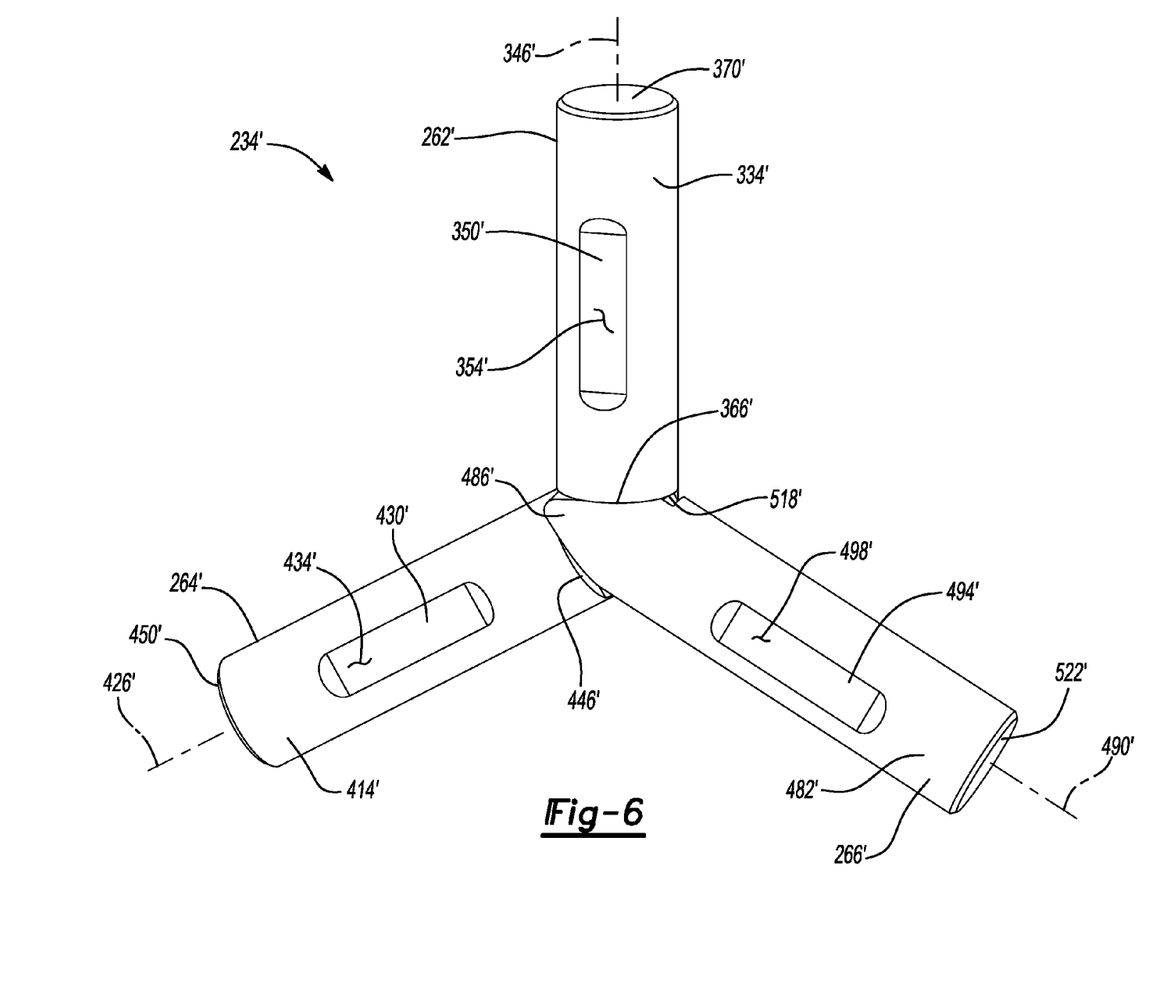
FIG. 6 is a perspective view of a cross-pin assembly of a second construction in accordance with the present teachings.

With additional reference to FIG. 6, a cross-pin assembly 234' of a second construction is illustrated. The cross-pin assembly 234' can be similar to the cross-pin assembly 234 (FIGS. 3-5), except that the cross-pin assembly 234' can be without the bores 398, 478, 550 (FIGS. 3 and 5) and without the retainer member 330 (FIGS. 3 and 5). In the example provided in FIG. 6, primed reference numerals refer to elements that are similar to those indicated with similar non-primed reference numerals in FIGS. 3-5. Accordingly, the descriptions of the similar elements is not repeated herein.

Thus, the present teachings provide for a cross-pin assembly 234, 234' such that when the pinion gears 246, 250, 254 are loaded, they can react against the first, second, and third pin members 262, 264, 266, 262', 264', 266', causing the proximal ends 366, 446, 518, 366', 446', 518' to react against one another and lock themselves to the differential case 226.

Figure 7:
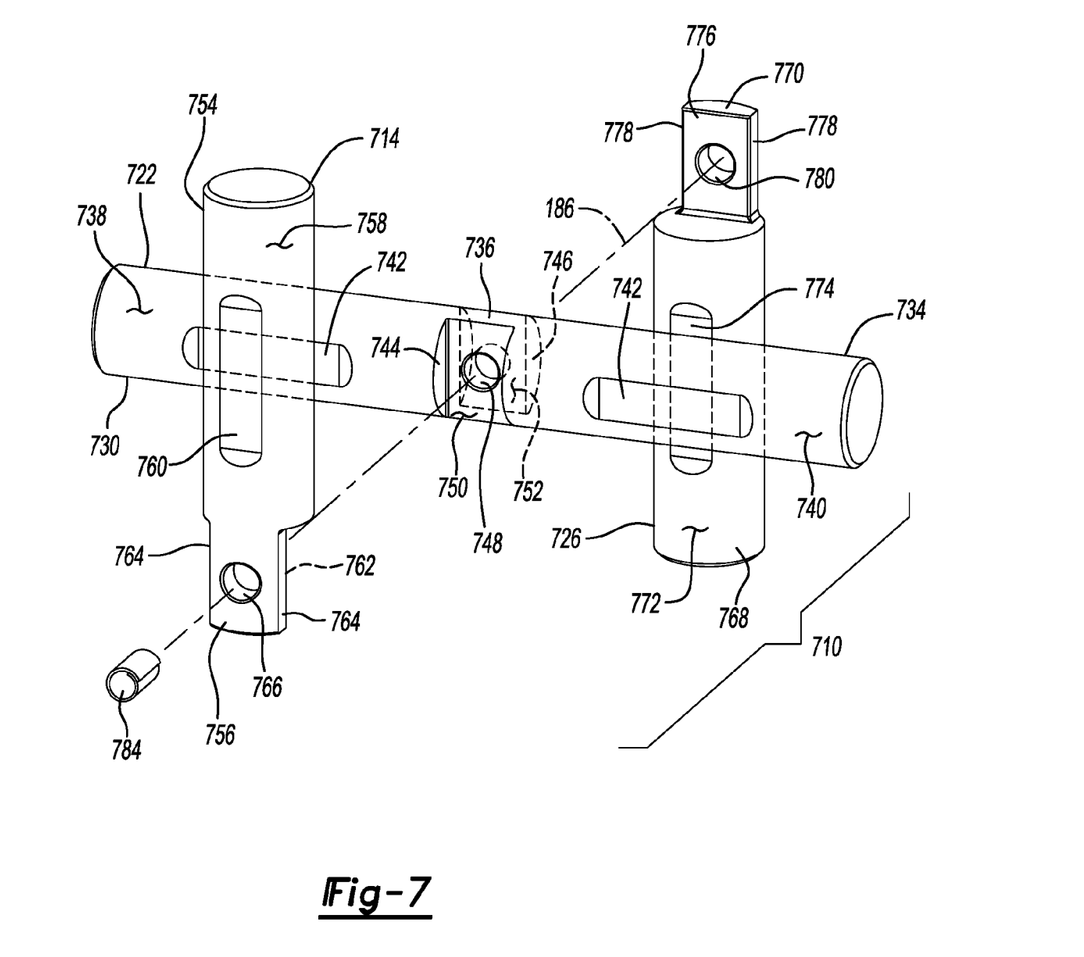
FIG. 7 is an exploded perspective view of a cross-pin assembly of a third construction in accordance with the present teachings.

With additional reference to FIG. 7, a cross-pin assembly 710 of a third construction is illustrated. The cross-pin assembly 710 can be similar to the cross-pin assemblies 234 and 234' (FIGS. 3-6), except as otherwise shown or described herein. The cross-pin assembly 710 can be used in an axle assembly that can be similar to the axle assembly 22 (FIG. 2), except that the differential assembly 120 (FIG. 2) can be configured with four differential pinions that can be equally spaced about the output axis 186, each differential pinion meshingly engaged with both side gears 238, 242 (FIG. 2).

In the example shown in FIG. 7, the cross-pin assembly 710 can be mounted to the differential case 226 (FIG. 2) for common rotation about the output axis 186 with the differential case 226 (FIG. 2). The cross-pin assembly 710 is described in greater detail below, but can generally have a first pin member 714, a second pin member 722, and a third pin member 726. The first pin member 714 can extend through the interior of the differential case 226 (FIG. 2) such that the longitudinal axis of the first pin member 714, is perpendicular to the output axis 186. In the example provided, the output axis 186 can intersect the longitudinal axis of the first pin member 714.

The second pin member 722 can extend through the interior of the differential case 226 (FIG. 2), such that the longitudinal axis of the second pin member 722 is perpendicular to the output axis 186 and perpendicular with the longitudinal axis of the first pin member 714. In the example provided, the output axis 186 can intersect the longitudinal axis of the second pin member 722. In the example provided, a plane (not specifically shown) formed by the output axis 186 and the longitudinal axis of the first pin member 714 can bisect the second pin member 722 into symmetrical halves and an intersection of the longitudinal axis of the first pin member 714, the longitudinal axis of the second pin member 722, and the output axis 186 can be a center of the cross-pin assembly 710.

The third pin member 726 can extend through the interior of the differential case 226 (FIG. 2), such that the longitudinal axis of the third pin member 726 is coaxial with the longitudinal axis of the first pin member 714.

The first and third pin members 714, 726 can be removably coupled to the second pin member 722 proximate to the center of the cross-pin assembly 710, as described below. The first and third pin members 714, 726 can extend longitudinally in opposite directions away from the center of the cross-pin assembly 710 (i.e., radially outward from the output axis 186). In other words, distal portions of the first, second, and third pin members 714, 722, 726 can be equally angularly spaced about the output axis 186 to form a generally cross or plus ("+") shape.

The first pin member 722 can include a first cylindrical body 754 and a finger or first attachment portion 756. The first cylindrical body 754 can have an outermost cylindrical surface 758 coaxial with the longitudinal axis of the first pin member 722. A first pinion gear similar to the pinion gears 246, 242, 254, can be rotatably disposed about the first cylindrical body 754 and meshingly engaged with both side gears 238, 242 (FIG. 2). In the example provided, the first cylindrical body 754 includes a pair of lubrication channels 760 that can be recessed radially inward from the outermost cylindrical surface 758. The lubrication channels 760 can be similar to the lubrication channels 742 except as otherwise shown or described herein.

The first attachment portion 756 can be fixedly coupled to the proximal end of the first cylindrical body 754 and can extend axially therefrom, with regards to the longitudinal axis of the first pin member 722. In the example provided, the first attachment portion 756 is unitarily formed with the first cylindrical body 754. The first attachment portion 756 can extend axially from a front side of the proximal end of the first cylindrical body 754. The first attachment portion 756 can have a face 762, a pair of side surfaces 764, and a bore 766 that can extend through the first attachment portion 756 and through the face 762.

The second pin member 722 can include a second cylindrical body 730 and a third cylindrical body 734 that are fixedly coupled together by a finger or middle body 736 (i.e., at the center of the cross-pin assembly 710). The second cylindrical body 730 can have an outermost cylindrical surface 738 coaxial with the longitudinal axis of the second pin member 714. A second pinion gear similar to the pinion gears 246, 242, 254, can be rotatably disposed about the second cylindrical body 730 and meshingly engaged with both side gears 238, 242 (FIG. 2). The third cylindrical body 734 can have an outermost cylindrical surface 740 coaxial with the longitudinal axis of the second pin member 714. A third pinion gear similar to the pinion gears 246, 242, 254, can be rotatably disposed about the third cylindrical body 734 and meshingly engaged with both side gears 238, 242 (FIG. 2). In the example provided, the second and third cylindrical bodies 730, 734 each include a pair of lubrication channels 742 that can be recessed radially inward from the corresponding outermost cylindrical surfaces 738, 740. The lubrication channels 742 can be similar to the lubrication channels 350 (FIGS. 3-5) except as otherwise shown or described herein.

The middle body 736 can be fixedly coupled to the proximal end of the second cylindrical body 730 and can extend axially therefrom to the proximal end of the third cylindrical body 734, with regards to the longitudinal axis of the second pin member 714. In the example provided, the middle body 736 is unitarily formed with the second and third cylindrical bodies 730, 734.

The middle body 736 can define a second attachment portion 744, a third attachment portion 746, and a bore 748. The second and third attachment portions 744, 746 can be disposed on opposite axial sides of the middle portion 736, relative to the output axis 186. The second attachment portion 744 can be a notch or channel that can be open at the outermost cylindrical surfaces 738, 740 and includes a first recessed surface 750 that can be recessed radially inward from the outermost cylindrical surfaces 738, 740. The third attachment portion 746 can be a notch or channel that can be open at the outermost cylindrical surfaces 738, 740 and includes a second recessed surface 752 that can be recessed radially inward from the outermost cylindrical surfaces 738, 740. In the example provided, the first and second recessed surfaces 750, 752 can be parallel to each other and perpendicular to the output axis 186 and can face in opposite axial directions relative to the output axis 186.

The bore 748 can be a cylindrical hole that can extend axially, relative to the output axis 186, through the middle portion 736 and can be open at the first and second recessed surfaces 750, 752. The bore 748 can be coaxial with the output axis 186.

The first attachment portion 756 can have a shape that is complementary to the shape of the second attachment portion 744 such that the first attachment portion 756 can be received in the second attachment portion 744. The face 762 of the first attachment portion 756 can oppose and abut the recessed surface 750. In the example provided, the side surfaces 764 can oppose and abut side walls of the second attachment portion 744 to inhibit rotation of the second pin member 722 relative to the first pin member 714. The bore 766 can be coaxial with the bore 748.

The third pin member 726 can be generally similar to the first pin member 714 and can include a fourth cylindrical body 768 and a finger or fourth attachment portion 770. In the example provided, the third pin member 762 is constructed identically to the first pin member 714, such that the first and third pin members 714, 726 can be interchangeable, though other configurations can be used. The fourth cylindrical body 768 can have an outermost cylindrical surface 772 coaxial with the longitudinal axis of the third pin member 726. A fourth pinion gear similar to the pinion gears 246, 242, 254, can be rotatably disposed about the fourth cylindrical body 768 and meshingly engaged with both side gears 238, 242 (FIG. 2). In the example provided, the fourth cylindrical body 768 includes a pair of lubrication channels 774 that can be recessed radially inward from the outermost cylindrical surface 772. The lubrication channels 774 can be similar to the lubrication channels 742, 760 except as otherwise shown or described herein.

The fourth attachment portion 770 can be fixedly coupled to the proximal end of the fourth cylindrical body 768 and can extend axially therefrom, with regards to the longitudinal axis of the third pin member 726. In the example provided, the fourth attachment portion 770 is unitarily formed with the fourth cylindrical body 768. The fourth attachment portion 770 can extend axially from a rear side of the proximal end of the fourth cylindrical body 768.

The fourth attachment portion 770 can have a shape that is complementary to the shape of the third attachment portion 746 such that the fourth attachment portion 770 can be received in the third attachment portion 746. The fourth attachment portion 770 can have a face 776 that opposes and can abut the recessed surface 752. In the example provided, the fourth attachment portion 770 includes a pair of side surfaces 778 that can oppose and can abut side walls of the third attachment portion 746. The fourth attachment portion 770 can further define a bore 780 that can extend through the fourth attachment portion 770 and be coaxial with the bore 748. Thus, the bores 748, 766, 780 can be coaxial and open to each other. In the example provided, the bores 748, 766, 780 can have the same diameters, though other configurations can be used.

The first, second, and third pin members 714, 722, 726 can be assembled such that the first attachment portion 756 is nested in the second attachment portion 744, the fourth attachment portion 770 is nested in the third attachment portion 746, the bores 748, 766, 780 align, and the first and fourth cylindrical bodies 754, 768 extend axially in opposite directions perpendicular to the second pin member 722. Thus, the first, second, third, and fourth attachment portions 744, 756, 746, 770 can overlap along the output axis 186. A retaining member 784, which can be similar to the retaining member 330 (FIG. 5) described above can be inserted into the bores 748, 766, 780 to retain the first, second, and third pin members 714, 722, 726 relative to each other. The cross-pin assembly 710 can be assembled within the differential case 226 (FIG. 2).

In an alternative construction, not specifically shown, the cross-pin assembly 710 can be configured without the bores 748, 766, 780 and without the retaining member 784.

Figure 8:
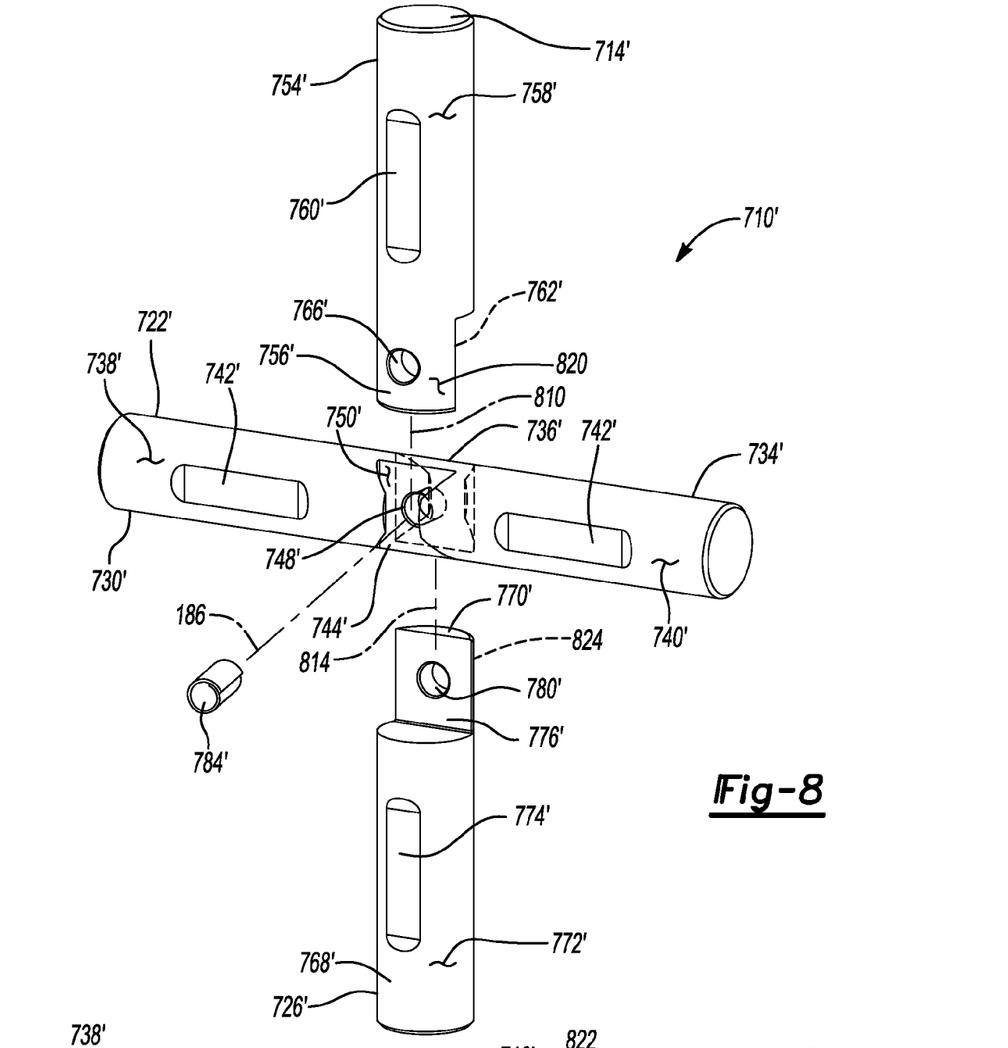
FIG. 8 is an exploded perspective view of a cross-pin assembly of a fourth construction in accordance with the present teachings.
Figure 9:
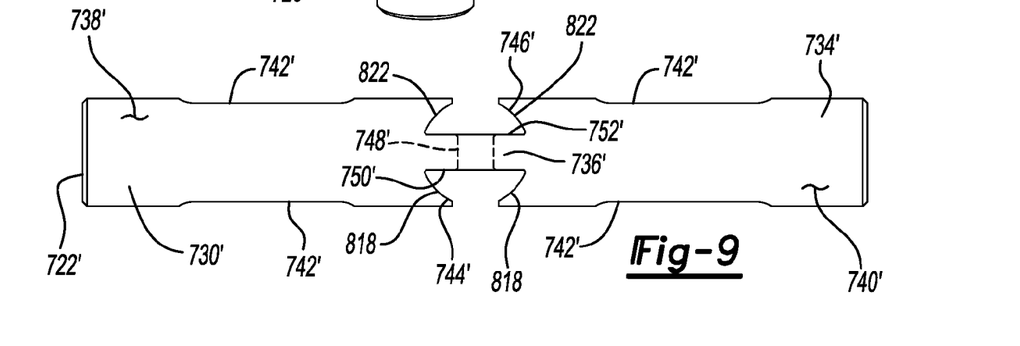
FIG. 9 is a top plan view of a portion of the cross-pin assembly of FIG. 8.

With additional reference to FIGS. 8 and 9, a cross-pin assembly 710' of a fourth configuration is illustrated. The cross-pin assembly 710' can be similar to the cross-pin assembly 710 (FIG. 7) except as otherwise shown or described herein. In the example provided in FIGS. 8 and 9, primed reference numerals refer to elements that are similar to those indicated with similar non-primed reference numerals in FIG. 7. Accordingly, the descriptions of the similar elements is not repeated herein.

In the example provided in FIGS. 8 and 9, the second and third attachment portions 744', 746' can be apertures that extend at least partially through the outermost surfaces 738', 740'. The second attachment portion 744' can be open at least to one side of the second pin member 722' such that the first attachment portion 756' can slide into the second attachment portion 744' along a first receiving axis 810. The first receiving axis 810 can be perpendicular to the output axis 186 and the longitudinal axis of the second pin member 722'. The third attachment portion 746' can be open at least to the opposite side of the second pin member 722' such that the fourth attachment portion 770' can slide into the third attachment portion 746' along a second receiving axis 814. The second receiving axis 814 can be perpendicular to the output axis 186 and the longitudinal axis of the second pin member 722'. In the example provided, both of openings of the attachment portions 744', 746' extend fully through both sides of the second pin member 722', though other configurations can be used.

In the example provided, side walls 818 of the second attachment portion 744' extend axially, relative to the longitudinal axis of the second pin member 722', inward toward the output axis 186 to engage and prevent movement of the first attachment portion 756' axially along the output axis 186. The side walls 818 can engage an outer surface 820 of the first attachment portion 756'. In the example provided, the outer surface 820 can be a cylindrical surface that can be concentric with the outermost surface 758', though other configurations can be used. In the example provided, the side walls 818 do not meet in the center. In an alternative configuration, not specifically shown, the side walls 818 can meet such that the second attachment portion 744' can be an complete aperture defined by the side walls 818 and the recessed surface 750'.

In the example provided, side walls 822 of the third attachment portion 746' extend axially, relative to the longitudinal axis of the second pin member 722', inward toward the output axis 186 to engage and prevent movement of the fourth attachment portion 770' axially along the output axis 186. The side walls 822 can engage an outer surface 824 of the fourth attachment portion 770'. In the example provided, the outer surface 824 can be a cylindrical surface that can be concentric with the outermost surface 772', though other configurations can be used. In the example provided, the side walls 822 do not meet in the center. In an alternative configuration, not specifically shown, the side walls 822 can meet such that the third attachment portion 746' can be a complete aperture defined by the side walls 822 and the recessed surface 752'.

In an alternative construction, not specifically shown, the cross-pin assembly 710' can be configured without the bores 748', 766', 780' and without the retaining member 784'.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A differential assembly comprising:
a case adapted to be supported for rotation about an output axis;
a first side gear and a second side gear, the first and second side gears being rotatable about the output axis relative to the case;
a first pinion gear, a second pinion gear, and a third pinion gear, the first, second, and third pinion gears being meshingly engaged with the first and second side gears; and
a cross-pin assembly coupled to the case for common rotation about the output axis with the case, the cross-pin assembly including:
a first pin member including a first cylindrical body and a first finger fixedly coupled to a proximal end of the first cylindrical body, the first pinion gear being rotatably disposed about the first cylindrical body;
a second pin member including a second cylindrical body and a second finger fixedly coupled to a proximal end of the second cylindrical body, the second pinion gear being rotatably disposed about the second cylindrical body; and
a third pin member including a third cylindrical body and a third finger fixedly coupled to a proximal end of the third cylindrical body, the third pinion gear being rotatably disposed about the third cylindrical body;
wherein the first, second, and third fingers overlap along the output axis to non-rotatably couple the first, second, and third pin members together.

2. The differential assembly of claim 1, wherein the first finger includes a first side and a second side that extend from the proximal end of the first cylindrical body and converge to a tip of the first finger;
wherein the second finger includes a first side and a second side that extend from the proximal end of the second cylindrical body and converge to a tip of the second finger; and
wherein the third finger includes a first side and a second side that extend from the proximal end of the third cylindrical body and converge to a tip of the third finger;
wherein the proximal end of the first cylindrical body opposes the first side of the second finger and the first side of the third finger, wherein the proximal side of the second cylindrical body opposes the second side of the first finger and the second side of the third finger, and wherein, the proximal side of the third cylindrical body opposes the first side of the first finger and the second side of the second finger.

3. The differential assembly of claim 2, wherein the first and second sides of the first finger define a first interior angle of approximately 60°, wherein the first and second sides of the second finger define a second interior angle of approximately 60°, and wherein the first and second sides of the third finger define a third interior angle of approximately 60°.

4. The differential assembly of claim 1, wherein the first finger includes a first surface, the second finger includes a second surface and a third surface, and the third finger includes a fourth surface, the second and third surfaces facing opposite directions, the first surface opposing the second surface, the third surface opposing the fourth surface.

5. The differential assembly of claim 4, wherein the first, second, third, and fourth surfaces are perpendicular to the output axis.

6. The differential assembly of claim 1, further comprising:
a retainer member;
wherein, the first finger includes a first bore, the second finger includes a second bore, and the third finger includes a third bore, the retainer member being disposed within the first, second, and third bores to couple the first, second, and third pin members together.

7. The differential assembly of claim 6, wherein the retainer member is formed of a resilient material having an uncompressed outermost diameter greater than the first, second, and third bores.

8. The differential assembly of claim 1, wherein each of the first, second, and third pin members includes an outermost cylindrical surface and a lubrication channel recessed from the outermost cylindrical surface.

9. The differential assembly of claim 1, further comprising a fourth pinion gear meshingly engaged with the first and second side gears, wherein the second pin member includes a fourth cylindrical body, a proximal end of the fourth cylindrical body being fixedly coupled to a side of the second finger that is opposite the second cylindrical body, the fourth pinion gear being rotatably disposed about the fourth cylindrical body.

10. The differential assembly of claim 9, wherein the second pin member includes a pair of side walls that extend outward from the second surface to inhibit movement of the first finger relative to the second pin member.

11. A cross-pin assembly for a differential that includes a case adapted to be supported for rotation about an output axis, first and second side gears being rotatable about the output axis relative to the case, and first, second, and third pinion gears being meshingly engaged with the first and second side gears, the cross-pin assembly comprising:
- a first pin member including a first cylindrical body and a first finger fixedly coupled to a proximal end of the first cylindrical body, the first cylindrical body being adapted to support the first pinion gear for rotation relative to the case, the first finger including a first side and a second side that extend from the proximal end of the first cylindrical body and converge toward a tip of the first finger;
- a second pin member including a second cylindrical body and a second finger fixedly coupled to a proximal end of the second cylindrical body, the second cylindrical body being adapted to support the second pinion gear for rotation relative to the case, the second finger including a first side and a second side that extend from the proximal end of the second cylindrical body and converge toward a tip of the second finger; and
- a third pin member including a third cylindrical body and a third finger fixedly coupled to a proximal end of the third cylindrical body, the third cylindrical body being adapted to support the third pinion gear for rotation relative to the case, the third finger including a first side and a second side that extend from the proximal end of the third cylindrical body and converge toward a tip of the third finger;
- wherein the proximal end of the first cylindrical body opposes the first side of the second finger and the first side of the third finger, wherein the proximal side of the second cylindrical body opposes the second side of the first finger and the second side of the third finger, and wherein, the proximal side of the third cylindrical body opposes the first side of the first finger and the second side of the second finger.

12. The cross-pin assembly of claim 11, wherein the first finger includes a first surface, the second finger includes a second surface and a third surface, and the third finger includes a fourth surface, the second and third surfaces facing opposite directions, the first surface opposing the second surface, the third surface opposing the fourth surface.

13. The cross-pin assembly of claim 12, wherein the first, second, third, and fourth surfaces are perpendicular to the output axis.

14. The cross-pin assembly of claim 11, further comprising:
- a retainer member;

wherein, the first finger includes a first bore, the second finger includes a second bore, and the third finger includes a third bore, the retainer member being disposed within the first, second, and third bores to couple the first, second, and third pin members together.

15. The cross-pin assembly of claim 14, wherein the retainer member is formed of a resilient material having an uncompressed outermost diameter greater than the first, second, and third bores.

16. The cross-pin assembly of claim 11, wherein each of the first, second, and third pin members includes an outermost cylindrical surface and a lubrication channel recessed from the outermost cylindrical surface.

17. The cross-pin assembly of claim 11, wherein a longitudinal axis of the first cylindrical body forms a 60 degree angle with a longitudinal axis of the second cylindrical body and a longitudinal axis of the third cylindrical body.

18. A cross-pin assembly for a differential that includes a case adapted to be supported for rotation about an output axis, first and second side gears being rotatable about the output axis relative to the case, and first, second, third and fourth pinion gears being meshingly engaged with the first and second side gears, the cross-pin assembly comprising:
- a first pin member including a first cylindrical body and a first attachment portion fixedly coupled to a proximal end of the first cylindrical body, the first cylindrical body being adapted to rotatably support the first pinion gear;
- a second pin member including a second cylindrical body, a third cylindrical body, a second attachment portion, and a third attachment portion, the second and third attachment portions fixedly coupling a proximal end of the second cylindrical body to a proximal end of the third cylindrical body, the second cylindrical body being adapted to rotatably support the second pinion gear, the third attachment portion being adapted to rotatably support the third pinion gear; and
- a third pin member including a fourth cylindrical body and a fourth attachment portion fixedly coupled to a proximal end of the fourth cylindrical body, the fourth cylindrical body being adapted to rotatably support the fourth pinion gear;
- wherein the first, second, third, and fourth attachment portions overlap along the output axis.

19. The cross-pin assembly of claim 18, wherein the first attachment portion includes a first finger, the second attachment portion includes a first aperture, the first finger being slidably received within the first aperture.

20. The cross-pin assembly of claim 18, wherein the first attachment portion includes a first surface, the second attachment portion includes a second surface, the third attachment portion includes a third surface, and the fourth attachment portion includes a fourth surface, the second and third surfaces facing opposite directions, the first surface opposing the second surface, the third surface opposing the fourth surface.

* * * * *